Figure 1:
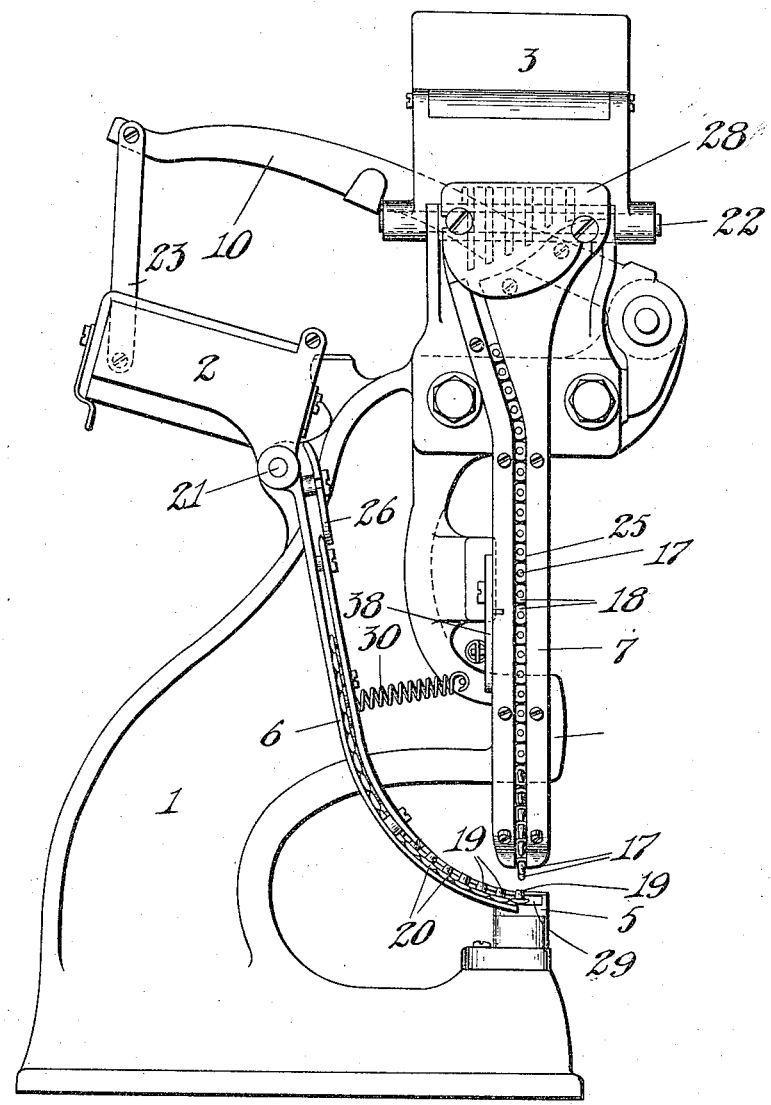

W. COBLEY, Jr. & T. J. BELLAMY.
FASTENER SETTING MACHINE.
APPLICATION FILED JULY 21, 1911.

1,181,292.

Patented May 2, 1916.
2 SHEETS—SHEET 1.

WITNESSES.

INVENTORS.

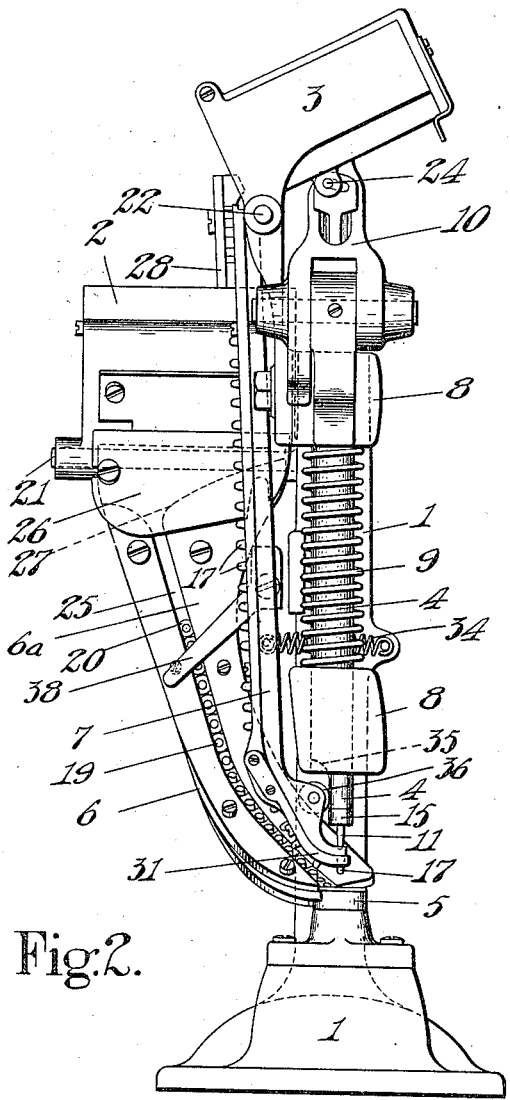
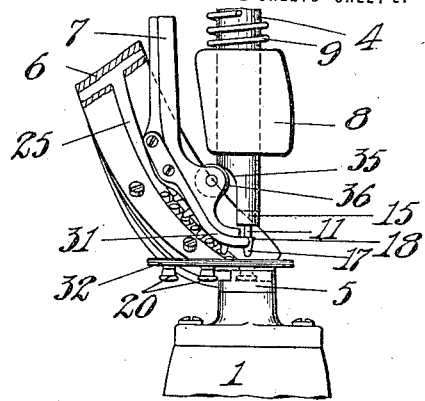
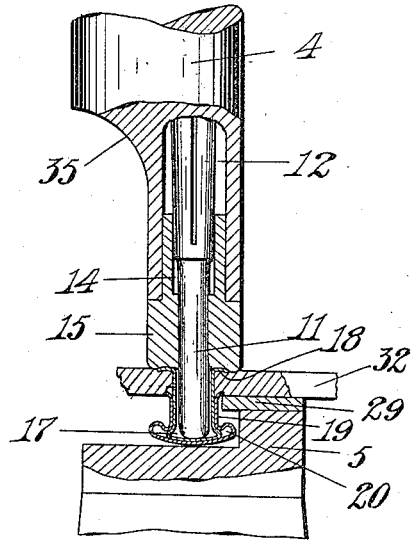
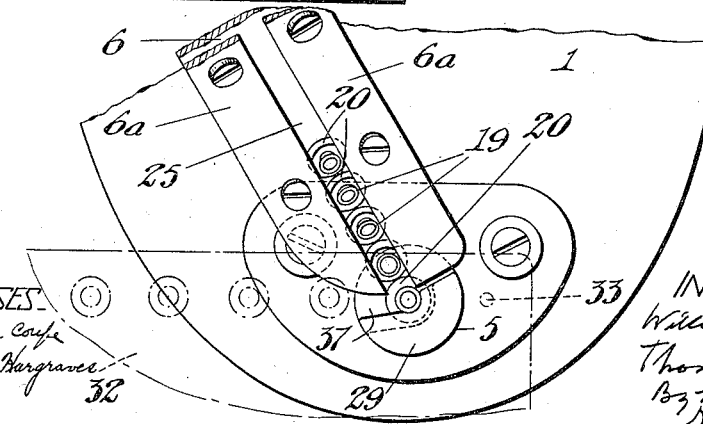

UNITED STATES PATENT OFFICE.

WILLIAM COBLEY, JR., AND THOMAS JOSIAH BELLAMY, OF EARL SHILTON, NEAR LEICESTER, ENGLAND, ASSIGNORS TO UNITED SHOE MACHINERY COMPANY, OF PATERSON, NEW JERSEY, A CORPORATION OF NEW JERSEY.

FASTENER-SETTING MACHINE.

1,181,292.  Specification of Letters Patent.  Patented May 2, 1916.

Application filed July 21, 1911. Serial No. 639,777.

*To all whom it may concern:*

Be it known that we, WILLIAM COBLEY, Jr., and THOMAS J. BELLAMY, subjects of the King of England, residing at Earl Shilton, near Leicester, Leicestershire, England, have invented certain Improvements in Fastener-Setting Machines, of which the following description, in connection with the accompanying drawings, is a specification, like reference characters on the drawings indicating like parts in the several figures.

This invention relates to machines for inserting two-part fasteners such, for example, as lacing studs used on the uppers of boots and shoes.

The invention is herein shown as embodied in a machine for inserting lacing studs of a particular form, consisting of two parts, viz:—a tubular shank or bottom and a tubular head or top portion. For the sake of brevity these portions will be hereinafter referred to as the bottom and the head, respectively.

The bottom of the stud comprises a circular flange from which projects a hollow tubular stem and the head portion consists of a hollow head furnished with a tubular neck. The tubular bottom and head parts are concentric, and in setting the stud the stem of the bottom portion is inserted through a perforation in the material and then the head is applied thereto, the tubular neck being telescoped on the stem projecting through the hole in the material. The two assembled parts of the stud are then clenched or forced together from opposite sides of the material, thereby causing the tubular stem of the bottom part to telescope farther within the neck or barrel of the head part, and causing the end of the stem of the bottom part to be expanded against the head, whereby the two parts of the stud are securely fastened together and to the material.

The operation of clenching the head and bottom part of the stud has been usually performed in a suitably actuated press, but, so far as we are aware, the feeding and alining of the flanged tubular bottom and the tubular headed parts of two-part lacing studs prior to the clenching or setting operation has heretofore been performed by hand, that is to say, the head and bottom of each stud separately has been applied to the material by hand.

An object of the present invention, accordingly, is to effect a mechanical and automatic feeding and alining of both parts of the stud preparatory to their being clenched, and the means employed for feeding and alining the parts are to operate automatically in conjunction with the clenching or setting devices and in combination with such devices, and constitute a complete machine for receiving the studs *en masse* and mechanically feeding, alining, and setting them.

A specific form of the clenching or setting mechanism will be hereinafter described, and it is to be understood that an important feature of this invention consists in the combination with such setting mechanism of means for mechanically and automatically feeding the two parts of the stud into juxtaposition on opposite sides of the material which is to receive them, after which the setting mechanism is actuated to clench the two parts together.

In the machine herein shown as embodying the invention, there are provided, in combination with setting mechanism, two boxes or hoppers, one to contain the heads *en masse* and the other to contain the bottom portions of the studs in a similar condition. Leading from the hoppers are raceways down which the heads and bottoms of the studs gravitate, and suitable means are furnished to position correctly the heads and bottoms before they enter the respective raceways. At the lower extremity of the raceway for the head portions there is arranged a stationary anvil which receives the fastener part on the under side of the material with its barrel extending upwardly. The other raceway is arranged so that the bottom portion of each stud is carried into position above the material and in alinement with the head portion with its barrel extending downwardly. The barrel of the bottom portion is also disposed in alinement with a spindle which is arranged to project concentrically into the barrel of both fastener parts during the setting operation. After the insertion and setting of the parts of one stud and the removal of the clenched stud from the setting devices, the parts of the next stud immediately and automatically are delivered to setting position. These and other features of the invention will be best understood and appreciated from the following description of a preferred embodiment thereof selected for purposes of illustration, and shown in the accompanying drawings in which,—

Figure 1 is a side elevation of the machine; Fig. 2 is a front elevation; Fig. 3 is a front view of the lower portion of the machine with the parts in the position which they occupy just prior to the setting operation; Fig. 4 is a vertical sectional view on an enlarged scale of the setting devices and a fastener in the positions which they occupy at the conclusion of the setting operation, and Fig. 5 is a plan view of the lower portion of the machine.

In the embodiment of the invention shown in the drawings the machine comprises a main frame or stand 1 which supports the two hoppers 2 and 3 for containing the stud parts. On the front of the stand is carried a reciprocatory clenching member and at the front of the base of the stand is located the lower setting device or anvil 5 between which and a setting die 15 forming a part of the clenching member the setting of studs is effected. Raceways 6 and 7 convey the parts of the studs respectively from hoppers 2 and 3 to their setting positions.

One form of clenching member comprises a vertically movable driver bar or rod 4 mounted in bearings 8, 8 on the front of the frame 1, said rod being normally held in an elevated position by a spring 9 and adapted to be actuated by a lever 10 connected in a convenient manner with any suitable operating mechanism such as a treadle or power driven device. In the lower end of the driver bar 4 is a slidable guide spindle or pin 11 having its upper portion 12 split longitudinally so that its sides may spring outwardly slightly to engage the sides of the hole 14 in which it is located. A spring, not shown, normally urges the spindle 11 downwardly. The spindle is retained in the end of the driver bar 4 by a shoulder formed in the clenching die 15 which is secured to the lower end of the bar 4. The function of the spindle 11 is to enter the stem 17 of the bottom portion 18 of the stud so that, as the clenching bar 4 and the die 15 descend, the stem 17 will be correctly guided into the hollow neck or barrel 19 of the head 20 located below it.

The hoppers 2 and 3 of the raceways 6 and 7 for containing and feeding the heads 20 and bottoms 18 of the studs respectively are similar in character to those used in connection with machines for inserting eyelets, but are especially constructed and arranged for effecting the objects of the present invention.

The hoppers 2 and 3 are mounted to oscillate upon the pins 21 and 22 respectively carried by the frame 1 and are actuated by means of suitable connections with the actuating lever 10. As herein shown the hopper 2 is connected to the lever 10 by the link 23 and the hopper 3 is connected to the lever 10 by the pin and slot connection 24. The heads and bottoms are contained *en masse* in their respective hoppers and are carried on false bottoms therein having openings through which a number of the parts fall each time the hoppers are rocked.

The open upper end of each raceway 6, 7 communicates with the open end of the slots under the false bottom of the hopper and each raceway has an undercut groove 25 suitably formed in a plate or formed by two or more parts secured together. The bottoms 18 of the studs pass down their raceway 7 with the flanges located in the undercut portion and the stems 17 projecting into or through the groove 25 of the raceway as shown in Figs. 1 and 2. The heads 20 of the studs pass down their raceway 6 in a similar manner with their heads located in the undercut portion and the barrels 19 in the groove 25 as shown in Figs. 1, 2 and 5. When delivered from the hopper 2 the heads are arranged with their barrels extending upwardly in the correct position for entering the raceway 6. An adjustable plate 26 is located over the open upper end of the head raceway 6 which end is enlarged or flared as shown at 27 in Fig. 2 to receive the heads from the hopper 2 and said plate prevents the heads from changing their positions before they enter the groove 25 on the raceway 6. The bottoms of the studs leave the hopper 3 also in the desired position with the stems extending upwardly as they enter the raceway 7.

The raceway 6 which feeds the heads 20 of the studs extends down from the hopper 2 and feeds the heads in inverted position to the lower setting die or anvil 5. In order to avoid the necessity for transferring mechanism the anvil is arranged in close proximity to the lower end of the raceway 6. When passing to the anvil 5 the large portion of the head passes into a cavity formed in part by an overhanging plate or flange 29, Figs. 4 and 5, which is suitably shaped to engage the barrel of the head so as to aline it with the stem of the bottom part and with the spindle 11. The plate 29 holds the head in correct position on the anvil 5 and acts as a stop to prevent the accumulated heads 20 in the raceway 6 from escaping. The raceway 6 is pivoted at 21 so that it may be swung away from the anvil 5 if necessary but is normally held up to said anvil by a strong spring 30.

The raceway 7 which supplies the bottoms 18, extends down from the hopper 3 and feeds the bottoms to the setting devices from one side as shown in Fig. 2. At its lower extremity this raceway is curved under so that it carries the bottoms 18 underneath the bar 4 with their stems extending downwardly. The spring latch 31 at the end of the raceway 7 prevents the accumulated bottom portions 18 therein from escaping and the endmost bottom part is held immediately over the inverted head and under the spindle 11 and die 15.

The bottom portion 18 of the stud is held a sufficient distance above the barrel 19 of the head to permit the material 32 to be placed between the two as shown in Fig. 3, the previously formed hole 33 in said material being placed over the barrel of the head or if preferred, on the depending stem of the bottom portion.

The bottom feeding raceway 7 is pivoted at 22 so that it may swing laterally and is yieldingly drawn to its feeding position by a suitable spring 34. A cam face 35 is formed on the bar 4 and is arranged to act upon a roller 36 journaled in lugs on the raceway 7 and swing the raceway outwardly, when the bar 4 has been depressed sufficiently to enter the spindle 11 in the stem of the lowermost bottom portion, thus leaving said bottom portion on the spindle 11. This displacement of the raceway 7 shifts the successors of the endless shank clear of the die 15.

After the bottom 18 and head 20 of the stud have been fed into setting position as shown in Fig. 3 and the material 32, face downward, has been correctly positioned relatively to the said parts, as previously explained and as represented by dot and dash lines in Fig. 5, the lever 10 is actuated to depress the bar 4 and setting die 15. The spindle 11 thereupon engages the bottom portion 18, the raceway is automatically displaced and the bottom portion is carried down, its stem being guided by the spindle 11 to enter the hollow barrel 19 of the head 20. The downward movement of the spindle 11 continues until the end of the stem 17 encounters the inner side of the head 20 against which it is then held by the spindle during the clenching operation. The continued movement of the lever 10 causes the setting die 15 on the bar 4 to move down the spindle 11 toward the anvil 5 and force the bottom portion 18 of the stud toward the head 20 clenching the two parts together on opposite sides of the material 32 while the spindle 11 yields by sliding into the bar 4. Clenching is produced by the upsetting or enlarging of the stem 17 when subjected to the endwise pressure exerted upon it by the setting die 15. While the stem is so subjected to pressure, it is prevented from collapsing or buckling inwardly by the spindle 11 and all deformation of the stem therefore must be in the nature of outward bulging. When the bar 4 moves upward again the laterally movable raceway 7 is returned to its normal position by the spring 34 and when the head 20 of the clenched stud is removed from the anvil 5 along the passage 37 by the lateral movement of the work the next succeeding head immediately moves forward and takes a similar position in the anvil 5. In like manner when the bottom portion 18 is removed from the raceway 7 the accumulated parts move down so that the next bottom part arrives at the end of the raceway and takes up a position under the end of the spindle 11. In order temporarily to hold the raceway 7 out of its delivering position the lever 38 is pivotally mounted thereon, the forward end of the lever being arranged to engage the frame when the lever is sung upwardly. Similiar means, not shown, may be provided in combination with the raceway 6 for the same purpose.

After clenching each stud in the material the operator manipulates the latter so as to remove the head of the clenched stud from the anvil and bring the next punched hole over the shank of the succeeding head part after which the clenching operation is repeated.

Having thus described our invention, what we claim as new and desire to secure by Letters Patent of the United States is:—

1. A machine for setting two-part fasteners having, in combination, a stationary anvil, a raceway constructed and arranged to deliver successively thereto parts of tubular fasteners, said parts being delivered automatically and simultaneously with the removal of a clenched fastener from the anvil, and means for centering a complementary fastener part over the anvil and forcing it into the barrel of the first part mentioned.

2. A machine for setting two-part fasteners having, in combination, a stationary anvil, a raceway for delivering a fastener part directly thereto in setting position, and a flange on said anvil arranged oppositely with respect to the raceway and acting to hold a flanged fastener part in setting position by engaging its barrel.

3. A machine for setting a headed tubular stud part in combination with a stud part having a flange and stem, said machine comprising an anvil having at its center a concavity shaped to receive a headed stud part, a raceway for the complementary flanged stud parts, a spindle arranged to remove a flanged stud part from the raceway and then yieldingly to press the end of its stem against the inner surface of the head of the headed stud part, a die shaped to fit the flange of the flanged stud part, and means for forcing the die toward the anvil to upset the end of the stem within the head of the headed stud part.

4. A machine for setting a headed tubular stud part in combination with a stud part having a flange and stem, said machine comprising an anvil having at its center a concavity shaped to receive a headed stud part, an oppositely disposed spindle constructed and arranged preliminarily to press the end of the stem of a flanged stud part against the inner surface of the head of a stud part held by the anvil, and a setting die arranged to act upon the flanged stud part while so pressed by the spindle to upset the end of its stem within the head of the headed stud part.

5. A machine for setting concentric tubular shank and tubular head parts of two-part lacing studs, having, in combination, a stop and anvil for locating the endmost of a series of heads, a guide pin to enter and center the endmost of a series of shanks, a die wider than the guide pin and shaped to abut against the outer end of the shank part, an abutment for the outer end of the head part, said die and abutment by a movement of relative approach coöperating to set the stud by telescoping and spreading the tubular portions one into the other, and an automatic displacer timed to shift the successors of the endmost shank clear of the die.

In testimony whereof we have signed our names to this specification in the presence of two subscribing witnesses.

WILLIAM COBLEY, Junior.
THOMAS JOSIAH BELLAMY.

Witnesses:
CLAUD BENNION,
WALTER W. BALL.

Copies of this patent may be obtained for five cents each, by addressing the "Commissioner of Patents, Washington, D. C."